United States Patent [19]

Faroudja

[11] Patent Number: 5,063,438
[45] Date of Patent: Nov. 5, 1991

[54] THREE DIMENSIONAL ENCODING SYSTEM FOR COLOR TELEVISION

[76] Inventor: Yves C. Faroudja, 26595 Anacapa Dr., Los Altos Hills, Calif. 94022

[21] Appl. No.: 511,644

[22] Filed: Apr. 20, 1990

[51] Int. Cl.[5] ............................................. H04N 9/78
[52] U.S. Cl. ...................................................... 358/31
[58] Field of Search ........................................... 358/31

[56] References Cited

U.S. PATENT DOCUMENTS

| 4,638,351 | 1/1987 | Clarke | 358/31 |
|---|---|---|---|
| 4,641,180 | 2/1987 | Richter | 358/31 |
| 4,656,502 | 4/1987 | Hausdorfer | 358/31 |
| 4,731,660 | 3/1988 | Faroudja et al. | 358/31 |
| 4,745,458 | 5/1988 | Hirano et al. | 358/31 |

FOREIGN PATENT DOCUMENTS

| 63295 | 3/1988 | Japan | 358/31 |
|---|---|---|---|
| 224494 | 9/1988 | Japan . | |
| 2116393 | 9/1983 | United Kingdom | 358/31 |

*Primary Examiner*—John W. Shepperd
*Attorney, Agent, or Firm*—David B. Harrison

[57] ABSTRACT

An encoding method for controlling the operation of a luminance comb filter encoder for processing a quadrature modulated subcarrier color television signal includes the steps of:
  separating spectral components at the vicinity of the subcarrier quadrature modulation from a full bandwidth luminance signal,
  separating chroma spectrum components from the separated spectral components by comb filtering,
  multiplying the separated chroma spectrum components by a control signal to provide a product,
  subtracting the product from the full bandwidth luminance signal to provide a comb filtered luminance signal, and
  generating the control as a function of motion detected to be present within the picture image of the full bandwidth luminance signal.

The method may also include the step of generating the control as a function of detected luminance transition level and detected chrominance transition level as selected by a logic circuit depending upon whether the television receiver decoder operates in spatial or temporal domains.

14 Claims, 4 Drawing Sheets

*FIG.—4*

THREE DIMENSIONAL ENCODING SYSTEM FOR COLOR TELEVISION

FIELD OF THE INVENTION

The present invention relates to a method and apparatus for processing quadrature modulated color television picture signals. More particularly, the present invention relates to a method and apparatus for controlling comb filter processing of a color television signal to reduce cross-color artifacts within a luminance component path with a control signal derived from spatial and temporal picture information.

BACKGROUND OF THE INVENTION

It is known that quadrature modulated subcarrier color television formats and systems are plagued in some picture conditions with a spectral overlap between the chroma subcarrier information and the high frequency luminance information with which the chroma information is interleaved. This spectral overlap has led the present inventor to examine carefully the subject of pre-processing a composite color signal at the camera or television studio or transmitter in order to minimize the spectral overlap prior to transmission. One example of the present inventor's prior work with adaptive encoding of quadrature modulated subcarrier color television signals is to be found in the method and apparatus described in U.S. Pat. No. 4,731,660, in the name of the present inventor and another. The disclosure of this prior patent (hereinafter "the referenced '660 patent") is hereby incorporated by reference into the present patent.

When a comb filter is used in the luminance path of a television color signal encoder in order to reduce cross-color effects after demodulation and decoding, there is a risk that the resolution of diagonal transitions in the picture display will be reduced. This risk has been minimized in the prior art by the use, for example, of the apparatus of the referenced '660 patent.

In the referenced '660 patent a method and system were described which carried out luminance comb filtering in response to a variable threshold derived as a function of at least one of luminance diagonal transition level, chroma level and averaged luminance activity in the signal spectrum in the vicinity of the color subcarrier. In other words, in the prior approach described in the referenced '660 patent, the frequency components which were otherwise creating cross-color artifacts were isolated from the composite picture and were then eliminated from the luminance path when, and only when, they were likely to result in cross-color artifacts upon decoding with conventional color decoders. The control was based upon adaptivity in the spatial domain, i.e. the measurement of the potential amount of cross-color damage and the generation of a control for eliminating the damage before it happened.

With prior art color decoders at the receiver, the method and apparatus described in the referenced '660 patent works well for most picture situations, but not for all picture situations. By prior art color decoders is meant decoders which have no comb filter luminance-chrominance separators, or which have very rudimentary comb filters based on a one scan line (1H) delay.

A drawback of the approach followed in the referenced '660 patent was that the described comb filter structure operated only upon information presented in the horizontal and vertical spatial domains. No motion control information was available from the temporal domain to control the operation of the comb filter structure. However, motion within the picture image has a direct impact upon the perception of cross-color.

One reason for following the method and implementing the apparatus described in the referenced '660 patent was the cost of implementation. Heretofore, temporal domain processing has been very expensive and has been implemented only in very expensive television systems. However, the cost of solid state frame storage devices is markedly declining to a cost level at which it becomes practical to include frame stores within both signal encoders and signal decoders of a color television system. Until the advent of relatively low cost temporal domain decoders, it was not very desirable or useful to implement time domain processing in the signal encoder.

Recently, NEC has proposed a receiver/decoder which uses time domain processing. In the NEC decoder chroma and luminance paths are separated by averaging over four fields (two frames). When four fields are averaged with plus coefficients, pure luminance is obtained. When four fields are averaged with minus coefficients, pure chrominance is obtained. However, this chroma-luminance separation process only works when there is no motion in the picture. When the picture moves, the averaging structure collapses. Thus, some attempts have been made by NEC, for example, to have motion adaptive decoding processes based upon motion detectors at the receiver. These processes essentially switch to the spatial domain when the time domain comb filtering process collapses.

In practice, this approach is not working very well because of the difficulty in distinguishing between motion and no motion conditions in the picture. It must be remembered that the color picture signal that is received is expected to be degraded and noisy, and it very frequently is degraded. The cumulative noise level, beginning at the camera and extending throughout the entire distribution path to and including signal processing elements of the receiver, introduces a very high threshold for motion recognition, which is above the cross-color generated by conventional encoding techniques and encoders. In other words, the temporal domain decoders, such as the NEC decoder using the IDTV approach in Japan, are collapsing in the presence of motion. The decoder works well when the picture image is stationary. When the picture moves, cross color and cross luminance artifacts become visible in the picture display.

Some improvement has been realized in Japan through use of encoders employing the spatial domain adaptivity techniques described in the referenced '660 patent. However, the approach being followed is perceived by the present inventor to be conceptually misdirected, and results in an unnecessary compromise in picture quality at the display. This compromised approach attempts to provide a full bandwidth when the picture image does not move by providing a very complex, and heretofore very expensive decoder including field delays. However, at the transmission end of the path, the encoder comb filter is usually operating, and by operating is reducing the bandwidth of diagonal transitions, a bandwidth the expensive decoder cannot not make up. Thus, for the new temporal domain decoders, a hitherto unsolved need has been for an encoder which is controlled by temporal domain activity, i.e. motion in the picture image, in a manner which is optimized for temporal domain decoders.

Another advantage for scene adaptive temporal domain encoding is that the appearance of cross-color artifacts in the picture display is much worse with moving picture elements than it is for stationary picture elements. Without motion, a luminance diagonal transition at 45° will flicker at a constant 15 Hz rate in the NTSC signal format, creating chroma cross-color components which are changing phase at the 15 Hz rate. If the diagonal transition moves at a certain velocity, these chroma components become locked at a certain hue or color, such as solid red or solid green, for example. A solid color cross-color artifact is far more perceptible and is far more objectionable to the viewer than are the cross-color artifacts which merely flicker at 15 Hz, for example.

The reader skilled in the art will recognize that the new temporal domain decoders and the older spatial domain decoders are, to a certain extent, two non-compatible structures within the existing color television signal format, such as NTSC. While they are compatible in the sense of providing a color picture, the optimizations for the two decoders are not at all the same.

With spatial domain decoders of the prior art, it is very desirable to use adaptive time domain processing in the encoder structure. One optimization may be selected for spatial domain decoding and another optimization may be selected for temporal domain decoding. It is even more desirable to use scene-adaptive temporal domain processing within the encoder when it is known that a temporal domain decoder structure will be used at the television receiver/display. One optimization may be selected for spatial domain decoding and another optimization may be selected for temporal domain decoding.

SUMMARY OF THE INVENTION

A general object of the present invention is to provide a method and apparatus for controlling comb filter encode processing of a color television signal to reduce cross-color artifacts within a luminance component path with a control signal derived from motion information obtained from the picture, in a manner which overcomes the limitations and drawbacks of the prior approaches.

Another object of the present invention is to provide a three dimensional encoder for color television which adaptively reduces cross-color components within a luminance signal path in response to a control signal derived from a plurality of picture conditions including a chroma level condition and a motion condition.

A further object of the present invention is to provide a control system for a comb filter within a color television encoder signal processing path which may be optimized to the characteristics of spatial domain decoding and also optimized to the characteristics of temporal domain decoding in a manner which overcomes the limitations and drawbacks of the prior art.

In accordance with the principles of the present invention, a method is provided for controlling the operation of a luminance comb filter encoder for processing a quadrature modulated subcarrier color television signal. The method includes the steps of:

applying a combed luminance component of the signal at the vicinity of the quadrature modulation to a threshold circuit, passing the combed luminance component through the threshold circuit in relation to the magnitude of a combing control signal applied to the threshold circuit, subtracting the passed combed luminance component from a baseband luminance component, and generating the combing control signal by the step of detecting motion in the television signal and generating a motion control value therefrom, and generating the combing control signal as a function of the motion control value.

In this aspect of the invention, the step of generating the combing control signal may include the further steps of detecting luminance transition level in the television signal and generating a luminance control value therefrom and detecting chrominance transition level in the television signal and generating a chrominance control value therefrom; and, the step of generating the combing control signal is carried out in function of the state and magnitude of the luminance control value and the chrominance control value, as well as the motion control value.

In one aspect of the invention applicable to spatial domain decoders the step of generating the combing control signal comprises the step of putting out a comb control signal to the threshold circuit whenever motion is present in the picture; and when no motion is present, putting out a comb control signal to the threshold circuit when either or both the luminance control value and chrominance control values are above predetermined amplitude levels. In an aspect of the invention applicable to temporal domain decoders, the step of generating the combing control signal comprises the step of putting out a value to the threshold circuit whenever motion is present in the picture, and putting out a value to the threshold circuit when no motion is present and only when the chrominance control value is above a predetermined amplitude level, irrespective of the level of the luminance control value.

In one more aspect of the present invention, the combed luminance component of the signal at the vicinity of the quadrature modulation is comb filtered by the steps of chrominance comb filtering the quadrature modulated subcarrier color television signal to provide a chroma comb filtered component, and subtracting the chroma comb filtered component from a bandpass component of the quadrature modulated subcarrier color television signal at the vicinity of the quadrature modulation.

In this aspect of the present invention, the step of chrominance comb filtering is carried out by the steps of:

delaying the television signal by two successive line scan periods to provide an undelayed component Y1, a one scan line period delayed component Y2, and a two scan line period delayed component Y3, combining the components in the amounts of:

$-\frac{1}{4}Y1+\frac{1}{2}Y2-\frac{1}{4}Y3$ to provide a sum, and subtracting the sum from the one scan line period delayed component Y2 to provide the chroma comb filtered component.

In accordance with the principles of the present invention, a luminance comb filter is provided for processing a quadrature modulated subcarrier color television picture signal. The luminance comb filter includes a main path carrying a baseband luminance component of the picture signal; a path carrying a comb filtered component of luminance at the vicinity of the quadrature modulation; a threshold circuit receiving the comb filtered component of luminance at the vicinity of the quadrature modulation and controlled by a combing control signal to provide an output; an adder circuit connected to the threshold circuit and to the main path for subtracting the output from the threshold circuit from the baseband luminance component to provide a comb filtered luminance output signal to a filter output; a threshold control circuit for generating the combing control signal and including a motion detector for detecting motion in the picture signal to provide a motion control signal, and a logic circuit responsive to the motion control signal for generating the combing control signal.

In this aspect of the present invention, the control circuit may further include a luminance detector for detecting transition levels in the comb filtered component of luminance at the vicinity of the quadrature modulation to provide a luminance control signal and a chrominance detector for detecting levels in chrominance components of the picture signal to provide a chrominance control signal, and the logic circuit is also responsive to the luminance control signal and to the chrominance control signal.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

Figure 1:
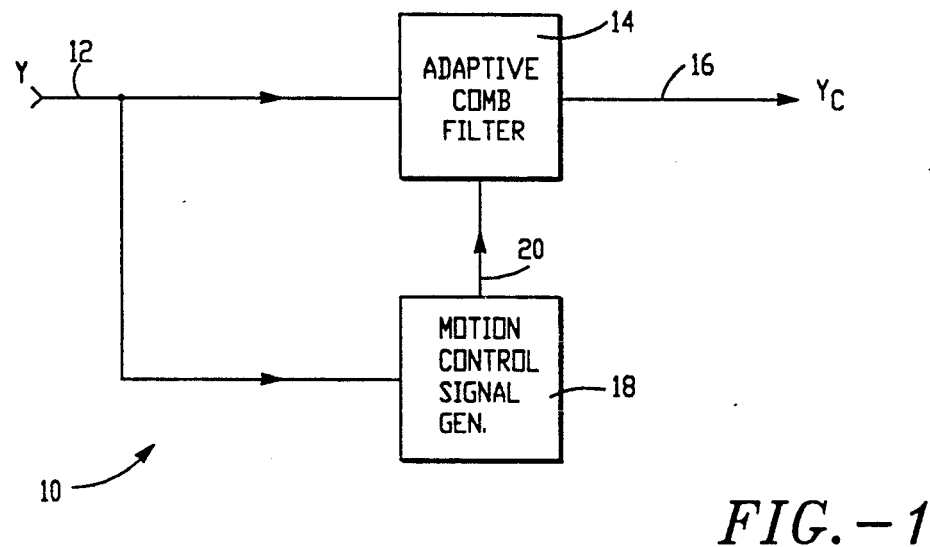
FIG. 1 is a simplified system block diagram of a luminance comb filter encoder which is controlled by motion information derived from the temporal domain in accordance with the principles of the present invention.

With reference to FIG. 1, a luminance encoder 10 includes an uncombed luminance input 12, an adaptive comb filter 14 and a combed luminance output 16. A motion control circuit 18 is connected to the input 12 and detects motion in the picture by comparing picture element locations on time delayed basis in order to generate a motion control signal. The motion control signal is then supplied over a line 20 to control the operation of the adaptive comb filter 14.

Figure 2:
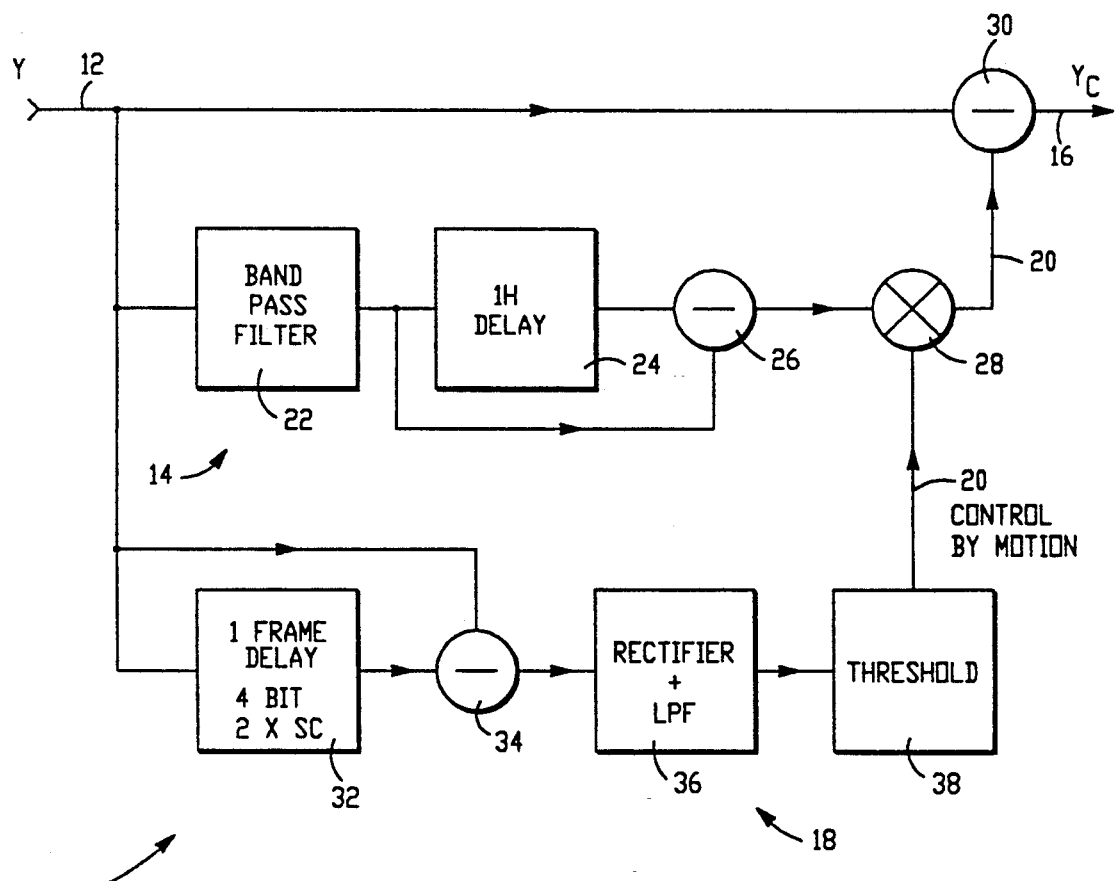
FIG. 2 is a more detailed block diagram of the FIG. 1 motion controlled luminance comb filter encoder.

FIG. 2 illustrates the FIG. 1 structure in greater structural detail. The adaptive comb filter 14 includes a band pass filter 22 connected to the input 12 for passing spectral components lying in the range of the chroma subcarrier and its sidebands. For example, the pass band of the filter 22 is approximately 2.1 MHz to 4.2 MHz in the NTSC color television signal format. The band pass filtered spectral components put out from the bandpass filter 22 are then delayed by one scan line period in a 1H delay 24. Delayed spectral components are then subtracted from undelayed spectral components in a subtractor 26 in order to obtain chrominance information. This chrominance information is then multiplied by a factor in a multiplier 28. The factor, supplied over the control line 20, is a fraction lying in a range between zero and unity. When there is a high level of motion activity, the control on the line 20 is at unity, and the chroma components are multiplied by unity and are then subtracted from the luminance signal on the line 12 in a subtractor circuit 30 to provide combed luminance.

The motion control signal generator 18 includes a one frame delay 32 connected to the input 12. The frame delay may be a digital memory device having a limited resolution per pixel, such as four bit. The digital implementation of the block 32 also presupposes the presence of an analog to digital converter which may be clocked at twice the subcarrier frequency and a digital to analog converter for converting the output of the memory array back to an analog value.

A subtractor 34 subtracts the output from the frame delay 32 from the input to provide a motion signal. The motion signal is then full wave rectified to remove its transition direction, and is low pass filtered in a rectifier/low pass filter circuit 36. The rectified and low pass filtered motion signal is then passed through a threshold circuit 38 which is set to pass the motion signal above a predetermined minimum level related to noise level. The output of the threshold circuit 38 provides the motion control signal on the line 20.

Figure 3:
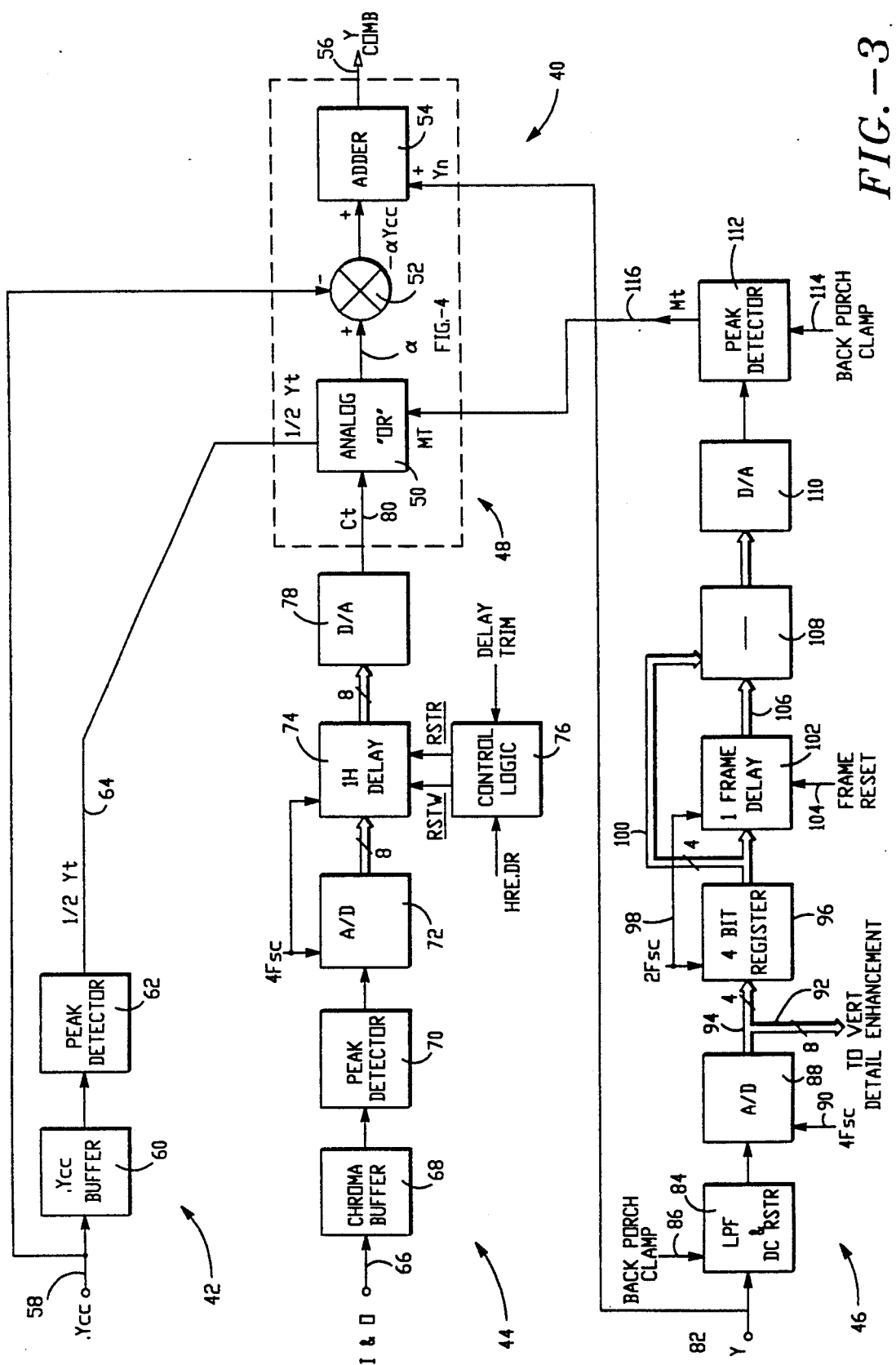
FIG. 3 is a more detailed block diagram of a luminance comb filter encoder which is controlled by information derived from the spatial and temporal domains in accordance with the principles of the present invention.

With reference to FIG. 3, a comb filter encoder 40 includes a chroma-combed luminance processing path 42, a composite chrominance processing path 44 and a temporal domain (motion) processing path 46. The paths 42, 44 and 46 result in control signals which are supplied to an three-dimensionally adaptive comb filter 48, depicted in greater circut detail in FIG. 4, discussed hereinafter.

The adaptive comb filter 48 includes an analog OR circuit 50 which identifies and puts out as an adaptivity control signal alpha the luminance or chrominance or motion control input signal having the highest level. The adaptivity control signal alpha also includes a component derived from the other two input signals of lesser magnitude.

The adaptivity control signal alpha is supplied to a multiplier circuit 52 which enables proportional control of comb filtering in function of the magnitude of the three-dimensional adaptivity control signal alpha. The circuit 52 multiplies the chroma-combed luminance signal by the adaptivity control signal alpha and puts out a minus alpha.Ycc signal representing the cross-color to be removed from the composite luminance.

The alpha.Ycc cross-color signal is then combined with composite luminance in an adder circuit 54, and an output 56 supplies luminance which has been comb filtered to remove cross color, wherein the comb filtering has been controlled by information derived from the horizontal and vertical spatial dimensions and from the temporal dimension as well. Since the only signals which are subtracted from the composite luminance are cross-color signals, comb filtering is applied only when it is needed, and only in an amount required for effective removal of cross-color, thereby maximizing the resolution of the luminance signal in all picture conditions other than those representing cross-color artifacts.

Turning now to the luminance path 42, an input 58 receives a delayed luminance component Ycc which has been comb filtered by subtraction of a comb filtered chrominance component as is taught by FIGS. 6 and 7, and the related text, in the referenced '660 patent, for example. The Ycc signal is then buffered in an analog buffer 60 and then peak detected in a peak detector circuit 62 in order to obtain the absolute value of the amplitude of luminance. The peak detector 62 puts out a control value ½ Yt over a line 64 which is e.g. one half of the amplitude of the detected peak amplitude of incoming luminance as measured by the peak detector 62. The luminance control value ½ Yt on the line 64 is supplied to the analog OR network 50 of the comb filter 48.

The chrominance path 44 includes an input 66 for receiving the composite chrominance (I and Q in the NTSC signal format). The composite chroma is buffered in an analog chroma buffer 68 and is then peak detected in a peak detector 70 which functions to obtain the absolute value of the composite chroma as was done with the luminance by the luminance peak detector 62.

The composite chroma is then passed through a delay matching circuit comprising an analog to digital converter 72, a 1-H delay storage array 74 operating under the control of a control logic circuit 76 and a digital to analog converter 78. The analog to digital converter 72 and the 1-H delay storage array 74 operate at four times the frequency of the color subcarrier (4Fsc), for example. An output of the digital to analog converter 78 supplies a delay matched chroma value Ct on a line 80 to the analog OR circuitry 50.

The temporal domain path 46 includes an input 82 which receives delayed and unfiltered luminance Y. (This luminance is also passed on to the adder circuit 54 of the comb filter 48, as already mentioned.) The luminance signal Y enters a low pass filter and DC restorer circuit 84. The low pass filter removes any high frequency luminance components above, e.g. 4.2 MHz which might otherwise result in undesired aliases upon digitization of the signal in an analog to digital converter 88 which quantizes at a 4Fsc rate in response to a quantization signal on a line 90. The DC restorer function of the circuit 84 is to clamp the back porch of the luminance to a voltage reference, and that reference is supplied over a control line 86.

An output bus 92 from the analog to digital converter 88 provides eight bit quantization values to other circuit processes within the encoder, such as vertical detail enhancement. Four of the bit lines are selected and formed into a 4-bit bus 94 to provide a decimated digitized baseband luminance signal in order to conserve circuitry, since 4-bit resolution is sufficient to detect motion reliably. The decimated 4-bit luminance nibbles on the bus 94 enter a 4-bit register 96 where they are held and clocked out by a clocking signal on a line 98 which operates at a rate which is twice the frequency of the color subcarrier (2Fsc). The 4-bit luminance nibbles then enter 4-bit bus 100 leading to a 1-frame delay memory array 102 and also to a 4-bit digital subtractor circuit 108. The frame delay 102 is reset by a frame reset control applied over a line 104.

After being delayed by a period of one frame in the 1-frame delay array 102, delayed luminance nibbles are put out over a 4-bit bus 106 to the subtractor circuit 108. The output of the subtractor circuit 108 is essentially zero when there is no motion from frame to frame at each quantized and decimated luminance pixel site in the picture display, and has a pixel difference magnitude when motion is present.

The pixel difference magnitude is a function of the difference in amplitude between the frame-differenced quantized and decimated pixel values. This magnitude is then converted into an analog value by a digital to analog converter 110, is then peak detected within a peak detector 112 clamped to a reference voltage level by a back porch clamp signal value supplied over a line 114, and is then put out as a motion control signal Mt over a line 116 to the analog OR logic circuitry 50.

Figure 4:
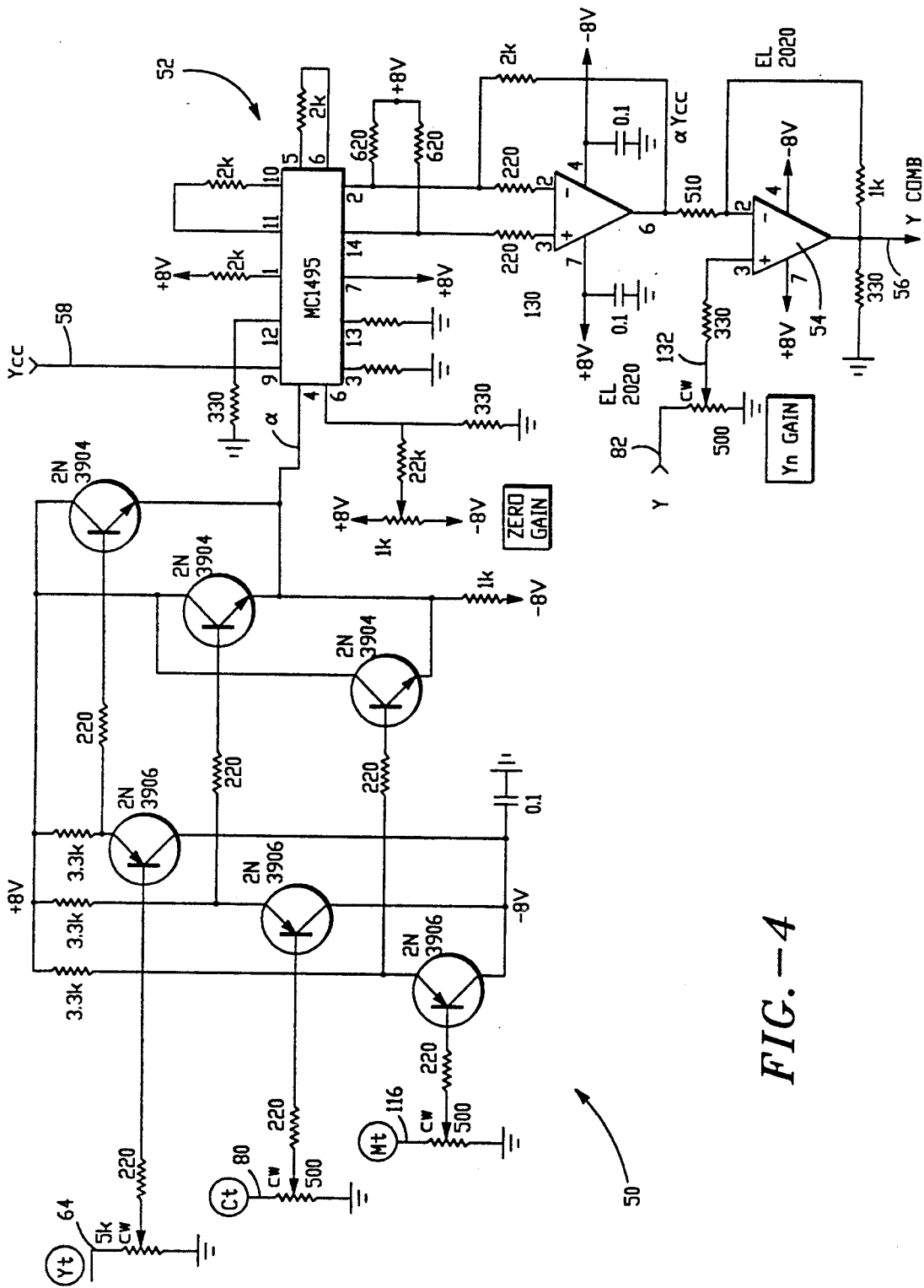
FIG. 4 is a more detailed schematic and block diagram of the structure of an analog OR array, threshold (multiplier) and adder circuit of the FIG. 3 encoder.

With reference to FIG. 4, one presently preferred implementation of the analog logic circuit 50 comprises three cascaded PNP-NPN amplifier arrays with common collector input and output stages and wherein a common emitter output provides the adaptivity control signal alpha. The analog logic circuitry 50 functions as a selector in order to select from the three incoming control signals Yt, Ct and Mt, and put out to the multiplier circuit 52, the incoming signal having the greatest amplitude. Potentiometers 122, 124 and 126 enable the incoming luminance control ½Yt, chrominance control Ct and motion control Mt to be scaled to proper amplitude ranges.

The multiplier circuit 52 is preferably implemented as a wideband four quadrant multiplier, such as Motorola type MC 1495, or equivalent, wired as shown in FIG. 4. As already explained, the combed luminance Ycc on the line 58 is multiplied by the adaptivity control signal alpha within the multiplier 52. A potentiometer 128 is set to establish a zero gain for the multiplier 52. An operational amplifier 130 combines the differential outputs from the multiplier chip into the alpha.Ycc signal which is supplied to the adder circuit 54 (implemented as a subtractor circuit in the FIG. 4 schematic diagram). The circuit 54 then subtracts the alpha.Ycc signal from the luminance signal on the line 82. A potentiometer 132 enables the baseband luminance level to be scaled to a desired range.

FIG. 4 sets forth component values for the circuit components included within the logic circuit 50, multiplier 52, adder circuit 54 and and amplifier circuit 130. When these values and voltages are employed, the functions ascribed herein for the logic circuit 50 are fully realized in practice.

The desired operation of the comb filter 48 will now be described for spatial domain decoders. When there is a small luminance diagonal transition with no corresponding chroma there will be no output from the multiplier 52. In this case nothing is subtracted from the baseband luminance at the adder 54, and there is no loss of resolution at a diagonal transition in the picture display. (Smaller amplitude luminance diagonal transition levels do not create objectionable cross-color artifacts, and so there is no reason to comb the luminance when they are present).

If the luminance level becomes very large at 45°transition, then there is an output from the multiplier 52 and combing occurs, as was the case in the system in accordance with the referenced '660 patent.

If there is a high chroma level, the slightest amount of cross-color becomes visible, and so the multiplier 52 puts out a cross-color combing value which is subtracted from the baseband luminance in the adder circuit 54.

If motion is present as represented by a magnitude of the Mt signal on the line 116, then there will be an output from the multiplier 52, whether or not there would be an output in the event of a low luminance diagonal transition signal and a low chroma signal. The motion control signal Mt causes a slight loss of resolution to be substituted in lieu of a flash of cross-color in motion (which may be a stationary color or hue at predetermined motion velocities as previously explained) and which may be very perceptible by, and objectionable to, the viewer. When there is no motion, the comb filter 48 operates as described in the referenced '660 patent.

The motion control signal Mt is lengthened so that it is applied slightly before the onset of motion and ends slightly after the end of motion in the picture. This approach is conservative and is intended always to bracket the picture elements in motion with comb filter action. The downside of this approach is the aforementioned very slight loss of picture resolution of the motion elements in lieu of flashes of cross-color. The eye-brain integration process is very insensitive to this loss, and most viewers will not perceive it.

The foregoing discussion of the operation of the analog OR circuit 50 is intended to apply to encoders used in television systems in which the receiver/displays employ conventional decoders, either of the 1H comb filter or trap variety. With receiver/displays employing temporal domain decoding techniques, the operation should be modified to optimize resolution at the picture display.

In the situation when a time domain decoder is present, the comb filter 48 is operating whenever there is motion, and whenever the chroma level Ct is high. However, when the chroma level is low, the comb filter 48 should be off irrespective of the level of the luminance control ½Yt on the line 64. The reason for this difference in operation is due to the fact that the time domain decoder will eliminate cross-color from non-moving objects, even if the luminance diagonal transition levels are high. There is therefore no need to reduce diagonal transition luminance resolution at the encoder even if the diagonal transition levels are high.

If it is known that the receiver/decoder will employ temporal domain decoding techniques as is increasingly the case in very high performance television receivers, the control can be set as just described. If it is expected that the receiver/decoder will employ more conventional techniques, then the former control will be employed. Adjustment of the potentiometers at the luminance input 64, chroma input 80 and motion input 116 to the logic circuit 50 easily accomplishes this adjustment between these two conditions.

Figure 5:
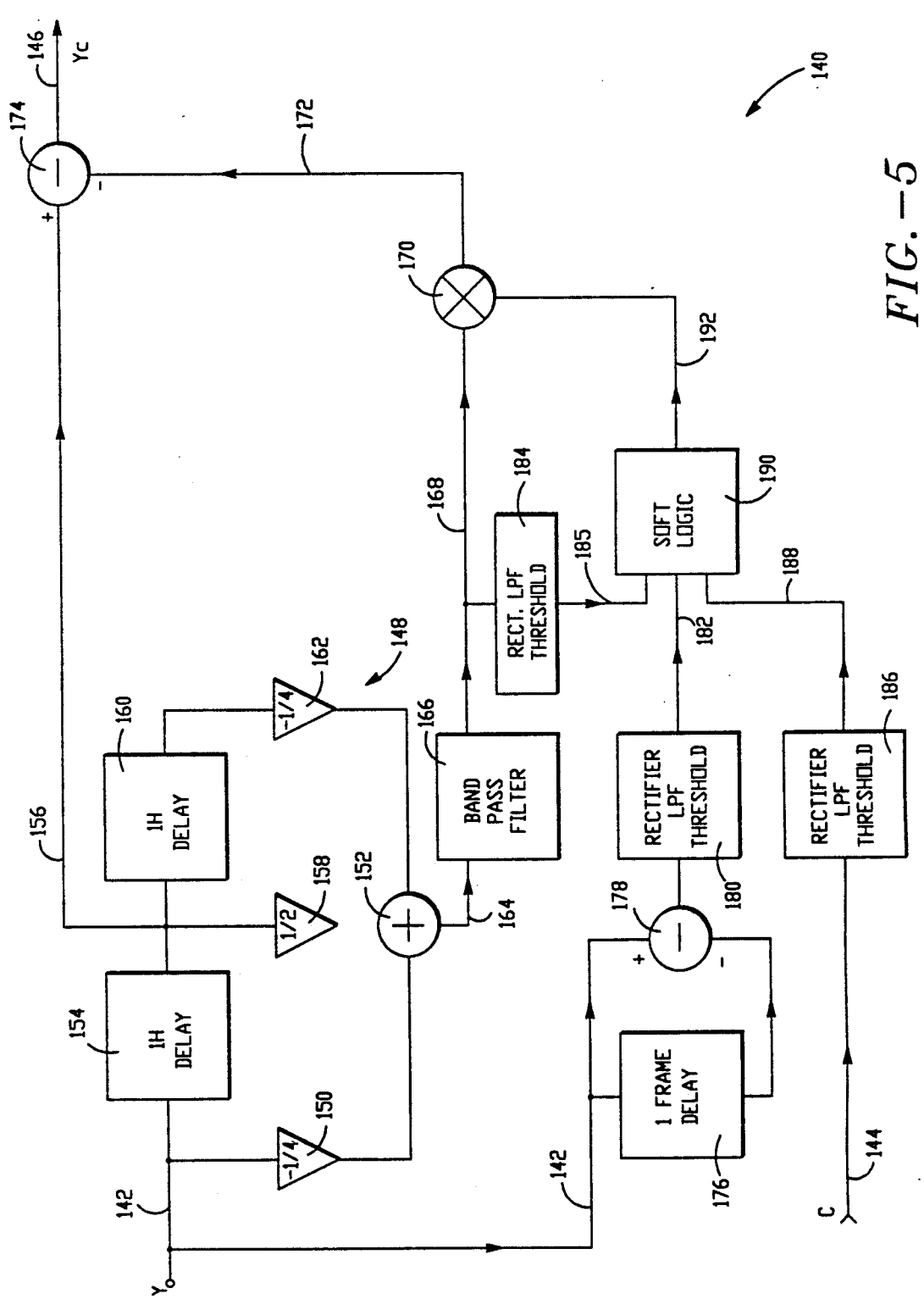
FIG. 5 presents a diagrammatic overview of a color television encoder system including the FIGS. 3 and 4 luminance comb filter encoder.

While those skilled in the art will appreciate that the circuit structure of FIGS. 3 and 4 is presently most preferred, FIG. 5 is presented as an overview of a tridimensional encoder system 140 incorporating the principles of the present invention. The system 140 includes a luminance input 142 and a chroma input 144, and it provides a combed luminance output 146.

The uncombed luminance at the input 142 is passed through a chrominance style comb filter structure 148 operating at the line scan (H) rate.

The chroma comb filter 148 will now be briefly described. Undelayed, uncombed luminance from the input 142 passes through a minus one quarter amplitude gain amplifier 150 to a summing junction 152. Undelayed luminance also passes through a 1H delay 154 to a line 156 carring uncombed luminance delayed by one scan line period from incoming luminance at the input 142. The line 156 extends to a half amplitude gain amplifier 158 whose output is supplied to the summing junction 152. The line 156 also extends to a second 1H delay 160 whose output is passed through a minus one quarter amplitude gain amplifier 162 and then to the summing junction 152. An output line of the summing junction 152 is luminance energy components which overlap the spectral areas nominally devoted to chrominance modulation information. This luminance energy comprises polluting information which is to be removed by adaptive subtraction from uncombed and 1H delayed main path luminance on the line 156.

The luminance energy on the line 164 is then band pass filtered in a filter 166 having a pass band adapted to pass energy components lying in the chroma subcarrier energy region (e.g. 2.1 to 4.2 MHz in the NTSC system). An output line 168 from the band pass filter 166 leads to a multiplicand input of a multiplier stage 170. The multiplicand signal is then multiplied by a multiplier value on a line.192 having a range lying between zero and one, wherein a zero value multiplier results in no luminance combing, and wherein a one value multiplier results in full luminance combing. A product put out on a line 172 by the multiplier 170 extends to a difference circuit 174 in the delayed main luminance path 156. The product on the line 172 is subtracted from the delayed main path luminance 156 to provide the combed luminance at the luminance output 146.

In accordance with the principles of the present invention, a motion detector is implemented with a one frame delay 176 connected to the luminance input, and a difference circuit 178 which subtracts frame delayed luminance from undelayed luminance on a pixel by pixel basis. An output comprising a difference is indicative of pixel motion and is then passed through a motion signal processor circuit 180 which rectifies the difference to remove sign, low pass filters the difference to stretch it over time, and puts it out when above a threshold set to be above system noise level. An output line 182 from the motion signal processor circuit comprises a motion control signal, and this signal is supplied to an analog soft logic circuit 190 which is implemented preferably in accordance with the circuit depicted in FIG. 4.

A luminance signal processor circuit 184 is connected to receive the polluting luminance information on the line 168. The circuit 184 rectifies, low pass filters and puts out the pollution signal as a luminance control on a line 185 to the soft logic circuit 190.

A chrominance signal processor circuit 186 receives chrominance information from the chrominance input 144 and rectifies, low pass filters and puts out the resultant above a noise threshold on a chrominance control line 188 also leading to the soft logic circuit 190.

Operation of the luminance encoder 140 is the same as described above for the circuitry of FIGS. 3 and 4, and the FIG. 5 diagram illustrates implementation of the FIGS. 3 and 4 circuits within a luminance encoder employing a chroma type comb filter separator.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A method for controlling the operation of a luminance comb filter in a color television system including the steps of:
   chrominance-type comb filter processing of at least that portion of a luminance component of a quadrature modulated color subcarrier television signal interleaved in the spectrum of the color subcarrier pass band and band pass filtering the luminance component to limit it to the spectrum of said color subcarrier pass band to provide a band pass filtered and combined luminance component,
   subjecting the band pass filtered and combed luminance component to a composite control which controls output of said band pass filtered and combed luminance component,
   generating the composite control by the steps of generating a motion control component as a function of motion present in the television signal and generating a chroma control component as a function of amplitude of a chroma component of the quadrature modulated color subcarrier television signal, and
   subtracting said band pass filtered and combed luminance component as passed by said composite control from a delay matched original luminance component to provide a combed original luminance component whenever said band pass filtered and combed luminance component is passed, and to provide a non-combed original luminance component whenever said band pass filtered and combed luminance component is not passed.

2. The method set forth in claim 1 wherein the step of generating the motion control component comprises the steps of detecting motion in a baseband luminance component of the television signal and generating the motion control component from detected motion.

3. The method set forth in claim 1 wherein the step of generating the composite control comprises the steps of:
   generating and putting out the composite control in function of chroma component amplitude above a predetermined threshold value irrespective of the motion component amplitude, and
   generating and putting out the composite control in function of motion component amplitude above a predetermined threshold value irrespective of the chosen component amplitude.

4. The method set forth in claim 1 comprising a further step of generating a luminance control component in function of luminance diagonal transition level, and wherein the step of generating the composite control includes the step of generating the luminance control component.

5. The method set forth in claim 4, wherein:
   the step of generating the chrominance control component comprises the steps of detecting amplitude level of the chrominance component and generating the chrominance control component in function of the detected chrominance component amplitude level,
   the step of generating the luminance control component comprises the steps of chroma comb filter separating a component from said luminance component detecting the amplitude level of said chroma comb filter separated component and generating said luminance control component in function of the detected chroma comb filter separated component level, and wherein the step of generating the composite control comprises putting out of composite control value in when the motion control component is a value other than zero irrespective of the values of the chrominance and luminance control components, and at least one of:
   putting out a composite control value when the chrominance control component has a value above a predetermined threshold irrespective of value of the motion control component and the value of the luminance control component,
   putting out a composite control value when the luminance control component has a value above a predetermined threshold irrespective of value of the motion control component and the value of the chroma control component, and
   putting out a composite control value when the luminance control component and the chrominance control component have values other than zero above predetermined low thresholds, irrespective of the value of the motion control component.

6. The method set forth in claim 1 wherein the step of generating the luminance control component comprises the steps of chroma comb filter separating a component from said luminance component, detecting the amplitude level of said chroma comb filter separated component, and generating said luminance control component in function of the detected amplitude level of the chroma comb filter separated component.

7. A method for controlling the operation of a luminance comb filter for encode processing of a quadrature modulated subcarrier color television signal including the steps of:
   applying a combed luminance component of the signal at the vicinity of the quadrature modulation to a multiplier circuit,
   multiplying the combed luminance component by a combing control signal applied to the multiplier circuit,
   subtracting the passed combed luminance component from a baseband luminance component, and
   generating the combing control signal by the steps of:
      detecting luminance diagonal transition level in the television signal and generating a luminance control value therefrom,
      detecting chrominance level in the television signal and generating a chrominance control value therefrom,
      detecting motion in the television signal and generating a motion control value therefrom, and
      generating the combing control signal as a function of the state and magnitude of the luminance control value, chrominance control value, and motion control value.

8. The method set forth in claim 7 for use with spatial domain television signal decoders and wherein the step of generating the control signal comprises the step of putting out a value to the multiplier circuit whenever motion is present in the picture, and putting out a value to the multiplier circuit when no motion is present and when the luminance control value is above a predetermined amplitude level.

9. The method set forth in claim 7 for use with temporal domain television signal decoders and wherein the step of generating the control signal comprises putting out a value to the multiplier circuit whenever motion is present in the picture, and putting out a value to the multiplier circuit when no motion is present and only when the chrominance control value is above a predetermined amplitude level, irrespective of the level of the luminance control value.

10. The method set forth in claim 7 wherein the combed luminance component of the signal at the vicinity of the quadrature modulation has been comb filtered by the steps of chrominance filtering the combed luminance component to provide a chroma comb filtered luminance component, band pass filtering the chroma comb filtered luminance component at the vicinity of the quadrature modulated color subcarrier, and subtracting the chroma comb filtered luminance component from a band passed component of the luminance component.

11. The method set forth in claim 10 wherein the step of chrominance comb filtering is carried out by the steps of:
    delaying the luminance component by two successive line scan periods to provide an undelayed component Y1, a one scan line period delayed component Y2, and a two scan line period delayed component Y3,
    combining the components Y1, Y2 and Y3 in the amounts of:
    $-\frac{1}{4}Y1+\frac{1}{2}Y2-\frac{1}{4}Y3$ to provide the chroma comb filtered luminance component.

12. A comb filter for processing a luminance component of a quadrature modulated color subcarrier television signal in the vicinity of the color subcarrier passband, the comb filter comprising an input for receiving the luminance component and an output, and having a first path between the input and output and including a delay circuit for delaying the luminance component by a period related to the line scan rate and subtraction circuit connected between the delay and the output, and a second path connected to the delay and comprising a chrominance type comb filter, a band pass filter connected to a output of the chrominance type comb filter for passing a spectrum in the vicinity of the color subcarrier passband followed by a combining control circuit means connected to supply a correction value to the subtraction circuit, the combining control circuit means being responsive to an adaptive control, and adaptive control generator means connected to the input and including motion detector means for detecting motion in the television signal to provide a motion control signal, luminance detector means connected to the input for detecting transition levels of the chrominance component in luminance at the vicinity of the quadrature modulation to provide a luminance control signal, and chrominance detector means connected to a source of chrominance components of the picture signal for detecting levels in the chrominance components to provide a chrominance control signal and wherein the adaptive control generator means generates the control signal as a function of the luminance control signal, the chrominance control signal and the motion control signal.

13. A luminance comb filter encoder for processing a quadrature modulated subcarrier color television picture signal comprising:
    a main path carrying a baseband luminance component of the picture signal,
    a path carrying a comb filtered component of luminance at the vicinity of the quadrature modulation,
    combining circuit means receiving the comb filtered component of luminance at the vicinity of the quadrature modulation and controlled by a combining control signal to provide an output,
    adder circuit means connected to the combining circuit means and to the main path for subtracting the output from the combining circuit from the baseband luminance component to provide a comb filtered luminance output signal to a filter output, and
    combining control circuit means for generating the combining control signal and including:
    luminance detector means for detecting transition levels in the comb filtered component of luminance at the vicinity of the quadrature modulation to provide a luminance control signal,
    chrominance detector means for detecting levels in chrominance components of the picture signal to provide a chrominance control signal,
    motion detector means for detecting motion in the picture signal to provide a motion control signal, and
    selection circuit means responsive to the luminance control signal, the chrominance control signal and the motion control signal for generating the combing control signal.

14. The luminance comb filter encoder set forth in claim 13 wherein the combining means comprises multiplier means for multiplying the comb filtered component of luminance at the vicinity of the quadrature modulation by the combining control signal.

* * * * *